WILLIAM F. WEIRICK, JOHN C. WELLER, AND DAVID E. ROHR, OF CHARLESTOWN, WEST VIRGINIA.

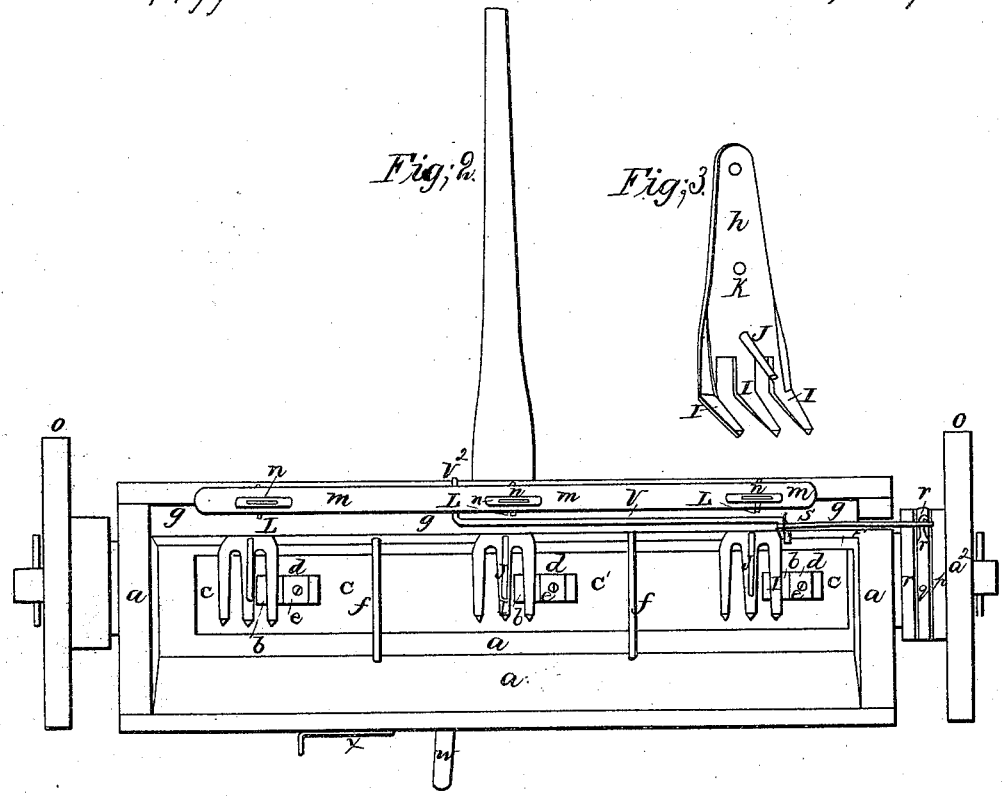
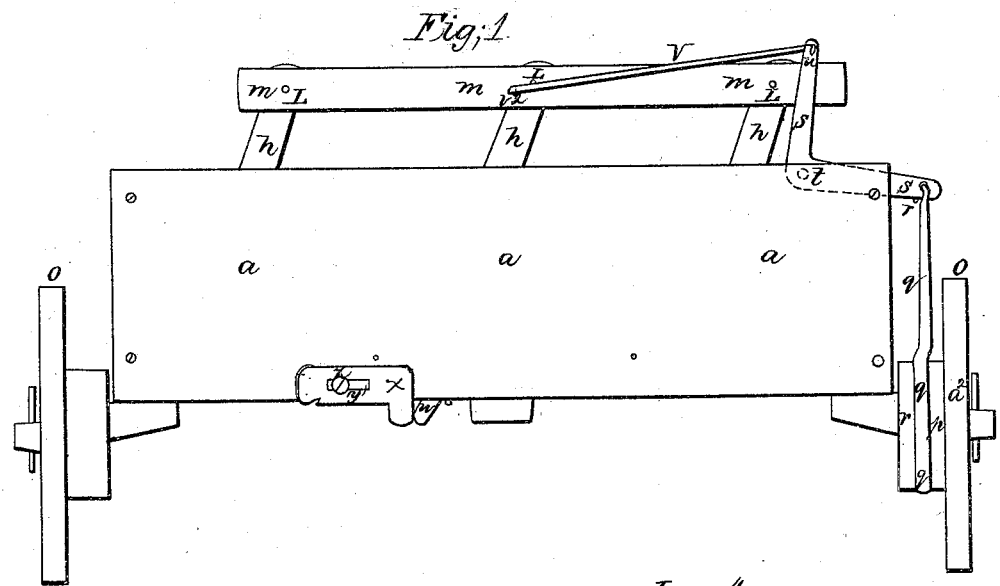

Letters Patent No. 86,477, dated February 2, 1869.

---

IMPROVEMENT IN MACHINE FOR DISTRIBUTING FERTILIZERS.

---

The Schedule referred to in these Letters Patent and making part of the same.

---

*To all whom it may concern:*

Be it known that we, WILLIAM F. WEIRICK, JOHN C. WELLER, and DAVID E. ROHR, of Charlestown, in the county of Jefferson, and State of West Virginia, have invented and made certain new and useful Improvements in Machines for Distributing Fertilizing Substances; and we do hereby declare that the following is a full, clear, and exact description of the same, reference being had to the accompanying drawings, and to the letters of reference marked thereon, and making a part of this specification, in which—

Figure 1 represents a view of the back of the machine.

Figure 2 represents a top and interior view of the machine.

Figure 3 represents a view of one of the distributing-devices detached.

The nature of our improvements consists in the peculiar form and arrangement of the devices for agitating the mass of matter to be distributed, said devices being constructed with two or more prongs and a tine, the prongs having angular-shaped scraping-edges, and set or bent at right angles to the lever-arm part thereof, and so arranged and operated as to have an oscillating motion right and left, in an arc of a circle, all of which will be more fully described hereinafter, to enable others to become skilled in the construction and operation thereof.

In figs, 1 and 2, letters $a\ a\ a\ a$ mark an oblong hopper-like box or receptacle, of any required size and capacity, either with or without a hinged lid or cover, and mounted on suitable transporting-wheels, as shown.

The bottom of the receptacle has a suitable number of vents or escapes, $b\ b\ b$, fig. 2, over which is arranged an adjustable sliding gauge-plate, $c\ c\ c\ c$, having longitudinal slots, $d\ d\ d$.

This plate $c\ c\ c\ c$ is kept in position by the screw-pins $e\ e\ e$, and the cross-rods $f\ f$.

To the inside upper surface of the front board of the hopper $a\ a\ a\ a$ is affixed a suitable rail-piece, $g\ g$, formed with suitable vertical mortises or cut-outs, (not shown in the drawings,) through which pass upwardly the lever-arm part $h\ h\ h$ of the forked and tine distributing-devices $I\ I\ I$, $J\ J\ J$, figs. 1 and 2, said devices being formed with an axis or fulcrum-place, $k$, fig. 3, the lever-arm part $h\ h\ h$ extending far enough upward, so as to connect, by pins $L\ L\ L$, with a yoke-coupling reciprocating-bar, $m\ m\ m$, provided with suitable slots or mortises $n\ n\ n$, situated in a vertical line over similar mortises, before referred to as formed in the rail-piece $g\ g\ g$, fig. 2.

Around the hub, on the inner side of one of the propelling-wheels $o\ o$, is arranged an eccentric or cam, $p\ p$, formed with a grooved channel, within and around which is adjusted an encompassing-collar, actuating rod $q\ q\ q$, formed with a bent or hooked end, $r$, which catches into an eye or hole in the end of a bell-crank, $s\ s$, which is attached by a fulcrum or axis, $t$, fixed to the side of the front of the hopper near one end, a suitable cut-out being formed, or sawed downward from the upper edge of the end-board of the hopper, to receive the bell-crank and admit of its working, as shown in fig. 2.

The upper end of the bell-crank also has an eye or hole, into which fits the hooked end, $u$, of a connecting-rod, $v$, which hitches on to the yoke-coupling bar $m\ m\ m$, as shown at $v^2$.

The sliding gauge-plate $c\ c\ c$ has connected with it, through the bottom of the hopper, a regulating-lever, $w$, and on the back part of the hopper, near the bottom edge, is a sliding graduating-plate $x$, formed with a longitudinal slot, $y$, held in position by a set-screw, $z$, fig. 2.

The operation of our improvements is as follows:

The fertilizing-substance being deposited in the hopper-receptacle $a\ a\ a\ a$, the propelling of the machine causes the driving-wheels $a^2\ a^2$ to operate the actuating-rod $q\ q\ q$, which imparts motion to the bell-crank $s\ s$. The connecting-rod $v$, and yoke-coupling bar $m\ m\ m$, all set in motion or operate the forked distributing-devices $I\ I\ I$, $J\ J\ J$, their under edges, as they move right and left, stirring up, pulverizing, and forcing the fertilizing-substance downward, and out through the escapes of the bottom of the machine, whilst the tines $J\ J\ J$ loosen up, and prevent the mass of the substance from choking or packing downwardly, over the escapes or outlets.

If a more or less quantity is required to escape through the outlets or escapes $b\ b\ b$ in the bottom of the machine, all that is necessary, is to set the graduating or gauge-plate $x$ nearer to or farther from the regulating-lever $w$, to be moved more or less right or left, whereby the graduating or gauge-plate $x$ affords a larger or smaller escape or outlet.

The advantages of our improvements over the several fertilizing-machines with which we are familiar, are very marked, because of the cheapness and simplicity of construction, great durability, the facility and convenience of using the machine by itself, or by combining it with any seeding, sowing, or drilling-machine, together with a most important distinguishing principle, the distributing-devices having an oscillating-movement, and their scraping-edges moving in the arc of a circle, whereby a portion of the fertilizing-substance is drawn from the mass both right and left, loosened, pulverized, and forced downward by the action of the angular or bevelled-surface and scraping-edges of the prongs $I\ I\ I$, fig. 2, whilst the tines $J\ J\ J$ at the same time stir up and loosen the mass, thus preventing choking or packing of the outlets, and affording a regular, uniform supply or quantity for distribution.

Having shown and described the construction, and clearly set forth the advantages of our improvements,

What we claim as new, and desire to have secured by Letters Patent of the United States, is—

1. The peculiar angular-shaped construction of the prong or fork-like agitating scraping-devices I I I, J J J, or their equivalents, when arranged to oscillate right and left, in the arc of a circle, so as to stir, loosen up, scrape, and force out the substance to be distributed, in the manner substantially as set forth and described.

2. The combination of said devices I I I, J J J, with the eccentric cam-device $p$ $p$, the bell-crank $s$ $s$, actuating-rod $q$ $q$, yoke-coupling bar $m$ $m$, graduating gauge-plate $c$ $c$, the regulating-lever $w$, and sliding plate $x$, substantially as shown, set forth, and described

WILLIAM F. WEIRICK.
   JOHN C. WELLER.
   DAVID E. ROHR.

Witnesses:
 MICHAEL S. WELLER,
 CHARLES M. HOUGH.